US012160901B2

(12) United States Patent
Lei et al.

(10) Patent No.: US 12,160,901 B2
(45) Date of Patent: *Dec. 3, 2024

(54) CONSIDERATIONS FOR A RANDOM ACCESS RESPONSE FOR A TWO-STEP RANDOM ACCESS PROCEDURE

(71) Applicant: QUALCOMM Incorporated, San Diego, CA (US)

(72) Inventors: Jing Lei, San Diego, CA (US); Wanshi Chen, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,307

(22) Filed: Apr. 25, 2023

(65) Prior Publication Data
US 2023/0345542 A1 Oct. 26, 2023

Related U.S. Application Data

(63) Continuation of application No. 16/892,670, filed on Jun. 4, 2020, now Pat. No. 11,672,013.
(Continued)

(51) Int. Cl.
*H04W 74/0833* (2024.01)
*H04L 1/00* (2006.01)
(Continued)

(52) U.S. Cl.
CPC ....... *H04W 74/0833* (2013.01); *H04L 1/0003* (2013.01); *H04L 1/0061* (2013.01);
(Continued)

(58) Field of Classification Search
CPC ......... H04W 74/0833; H04W 28/0278; H04W 72/23; H04W 76/11; H04W 74/006;
(Continued)

(56) References Cited

U.S. PATENT DOCUMENTS

| 11,672,013 B2 | 6/2023 | Lei et al. |
| 2018/0041988 A1* | 2/2018 | Lee ...................... H04L 1/1854 |

(Continued)

FOREIGN PATENT DOCUMENTS

| CN | 109845378 A | 6/2019 |
| WO | 2011099283 A1 | 8/2011 |

(Continued)

OTHER PUBLICATIONS

CAICT, Considerations on Procedure for Two-step Rach, 3GPP TSG RAN WG1 Meeting #97, Reno, USA, May 13-17, 2019, R1-1907197. (Year: 2019).*

(Continued)

*Primary Examiner* — Shailendra Kumar
(74) *Attorney, Agent, or Firm* — Harrity & Harrity LLP/Qualcomm Incorporated

(57) ABSTRACT

Various aspects of the present disclosure generally relate to wireless communication. A user equipment (UE) may transmit a random access message including a preamble and a payload. A base station may detect the preamble of the random access message. The base station, and may fail or succeed to decode the payload of the random access message. The base station may transmit, based at least in part on detecting the preamble and the different decoding outcome for the payload, a random access response. The random access response may include an uplink group grant and an indication for a type of the uplink group grant for a plurality of UEs whose preamble transmission share the same time and frequency occasion. UEs may monitor the type and the contents of the uplink group grant and transmit data subsequently on a set of shared time frequency resources. Numerous other aspects are provided.

20 Claims, 9 Drawing Sheets

Related U.S. Application Data

(60) Provisional application No. 62/859,604, filed on Jun. 10, 2019.

(51) Int. Cl.
    *H04L 5/00*     (2006.01)
    *H04L 5/10*     (2006.01)
    *H04W 28/02*     (2009.01)
    *H04W 72/23*     (2023.01)
    *H04W 76/11*     (2018.01)

(52) U.S. Cl.
    CPC .............. *H04L 5/0051* (2013.01); *H04L 5/10* (2013.01); *H04W 28/0278* (2013.01); *H04W 72/23* (2023.01); *H04W 76/11* (2018.02)

(58) Field of Classification Search
    CPC .......... H04W 72/0446; H04W 72/0453; H04L 1/0003; H04L 1/0061; H04L 5/0051; H04L 5/10; H04L 1/0025
    See application file for complete search history.

(56) References Cited

U.S. PATENT DOCUMENTS

| | | | |
|---|---|---|---|
| 2018/0097591 A1 | 4/2018 | Islam et al. | |
| 2018/0124822 A1* | 5/2018 | Wang | H04W 74/006 |
| 2018/0288676 A1* | 10/2018 | Wei | H04W 48/02 |

FOREIGN PATENT DOCUMENTS

| | | | | |
|---|---|---|---|---|
| WO | WO-2018127244 A1 | | 7/2018 | |
| WO | WO-2020197324 A1 | * | 10/2020 | ............ H04W 16/28 |

OTHER PUBLICATIONS

ZTE, Sanechips, Considerations on 2-Step RACH Procedures, 3GPP TSG RAN WG1 Meeting #96, Athens, Greece, Feb. 25-Mar. 1, 2019, R1-1901627. (Year: 2019).*

Intel Corporation, Further consideration of 2-step CBRA, 3GPP TSG-RAN WG2 meeting #104, Spokane, USA, Nov. 12-16, 2018, R2-1816697. (Year: 2018).*

VIVO, Discussion on 2-step RACH procedure, 3GPP TSG RAN WG1 Meeting #97, Reno, USA, May 13-17, 2019, R1- 1906125. (Year: 2019).*

Oppo, On Procedure for 2-step RACH, 3GPP TSG RAN WG1 #97, Reno, USA, May 13-17, 2019, R1-1906581. (Year: 2019).*

CAICT: "Considerations on Procedure for Two-step RACH," 3GPP TSG RAN WG1 Meeting #97, R1-1907197, 3rd Generation Partnership Project, Mobile Competence Centre, 650, Route Des Lucioles, F-06921, Sophia-Antipolis Cedex, France, vol. RAN WG1. No. Reno, USA, May 13, 2019-May 17, 2019, May 13, 2019, XP051728640, 8 pages, sections 2 to 2.3, subclause 2.3 Fallback scheme, figure 2.

Intel Corporation: "Further Consideration of 2-Step CBRA," 3GPP Draft, 3GPP TSG-RAN WG2 meeting #104, R2-1816697-2STEPRA-NRU_V00, 3rd Generation Partnership Project (3GPP), Mobile Competence Centre, 650, Route Des Lucioles, F-06921, Sophia-Antipolis Cedex, France, vol. RAN WG2. No. Spokane. USA, Nov. 12, 2018-Nov. 16, 2018, Nov. 12, 2018 (Nov. 12, 2018), XP051556266, 6 pages, sections 2 to 2.4.

International Search Report and Written Opinion—PCT/US2020/036354—ISA/EPO—Sep. 2, 2020.

Qualcomm Incorporated: "Procedures for Two-Step RACH", 3GPP TSG-RAN WG1 Meeting #96Bis, 3GPP Draft, R1-1904993 Procedures for Two-Step RACH, 3rd Generation Partnership Project, Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 7, 2019, Mar. 30, 2019, XP051691916, pp. 1-12, Sections 1-3, Sections 1-3, 2-7, Sections "3.1 RO Configurations for msgA" and "6. Fall-Back Procedures for Two-Step RACH".

VIVO: "Discussion on 2-step RACH Procedure", 3GPP Draft, 3GPP TSG RAN WG1 #97, R1-1906125_Discussion on Procedure for 2-STEP RACH, 3rd Generation Partnership Project (3GPP), Mobile Competence Centre, 650, Route Des Lucioles, F-06921, Sophia-Antipolis Cedex, France, vol. RAN WG1. No. Reno. USA, May 13, 2019-May 17, 2019, May 13, 2019 (May 13, 2019), XP051727581, 8 pages, section 2.2.2.

Zte, et al., "Considerations on 2-Step RACH Procedures", 3GPP Draft, 3GPP TSG RAN WG1 Meeting #96, R1-1901627, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051599324, 11 pages, p. 1, figure 1 p. 2, paragraph 2.1 p. 4, paragraph 3.1 p. 8, paragraph 3.5—p. 9, p. 3, line 10-line 20.

Fujitsu: "On recognition of msgB or msg2", 3GPP TSG-RAN WG2 Meeting #106, R2-1906257, Reno, USA, May 13-17, 2019, 5 Pages.

Nokia, et al., "UL Grant-Free Transmission for URLLC", 3GPP TSG-RAN WG1 #88, 3GPP Draft, R1-1703329_UL_URLLC_GRANT FREE_FINAL, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 13, 2017-Feb. 17, 2017, Feb. 12, 2017, 8 Pages, XP051210459.

OPPO: "On Procedure for 2-step RACH", 3GPP TSG RAN WG1 #97, R1-1906581, Reno, USA, May 13-17, 2019, 9 Pages.

Taiwan Search Report—TW109118954—TIPO—Jan. 21, 2024.

ZTE, et al., "Considerations on the Channel Structure of msgA", 3GPP draft, 3GPP TSG RAN WG1 Meeting #96, R1-1901626 Considerations on the Channel Structure of MSGA, 3rd Generation Partnership Project, Mobile Competence Centre, 650, Route Des Lucioles, F-06921 Sophia-Antipolis Cedex, vol. Ran WG1, No. Athens, Greece, Feb. 25, 2019-Mar. 1, 2019, Feb. 16, 2019, 5 Pages, Section 2.1, "2.2 Resource mapping in one PUSCH occasion"—"3 Conclusion".

* cited by examiner

CONSIDERATIONS FOR A RANDOM ACCESS RESPONSE FOR A TWO-STEP RANDOM ACCESS PROCEDURE

CROSS-REFERENCE TO RELATED APPLICATION

This Patent Application is a continuation application which claims priority to U.S. patent application Ser. No. 16/892,670 filed Jun. 4, 2020, entitled "DESIGN CONSIDERATIONS FOR A RANDOM ACCESS RESPONSE FOR A TWO-STEP RANDOM ACCESS PROCEDURE" which claims priority to U.S. Provisional Patent Application No. 62/859,604, filed on Jun. 10, 2019, entitled "DESIGN CONSIDERATIONS FOR RANDOM ACCESS RESPONSE FOR A TWO-STEP RANDOM ACCESS PROCEDURE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for a random access response for two-step random access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a preamble and a payload of a random access message associated with a two-step random access procedure; receiving a random access response, associated with the two-step random access procedure, including an uplink group grant and an indication of a type of the uplink group grant for a plurality of UEs including the UE; and transmitting an uplink communication on a set of shared time-frequency resources based at least in part on the uplink group grant.

In some aspects, a UE for wireless communication may include memory and one or more processors operatively coupled to the memory. The memory and the one or more processors may be configured to transmit a preamble and a payload of a random access message associated with a two-step random access procedure; receive a random access response, associated with the two-step random access procedure, including an uplink group grant and an indication of a type of the uplink group grant for a plurality of UEs including the UE; and transmit an uplink communication on a set of shared time-frequency resources based at least in part on the uplink group grant.

In some aspects, a non-transitory computer-readable medium may store one or more instructions for wireless communication. The one or more instructions, when executed by one or more processors of a UE, may cause the one or more processors to: transmit a preamble and a payload of a random access message associated with a two-step random access procedure; receive a random access response, associated with the two-step random access procedure, including an uplink group grant and an indication of a type of the uplink group grant for a plurality of UEs including the UE; and transmit an uplink communication on a set of shared time-frequency resources based at least in part on the uplink group grant.

In some aspects, an apparatus for wireless communication may include means for transmitting a preamble and a payload of a random access message associated with a two-step random access procedure; means for receiving a random access response, associated with the two-step random access procedure, including an uplink group grant and an indication of a type of the uplink group grant for a plurality of apparatuses including the apparatus; and means for transmitting an uplink communication on a set of shared time-frequency resources based at least in part on the uplink group grant.

In some aspects, a method of wireless communication, performed by a base station, may include detecting a preamble of a random access message associated with a two-step random access procedure, wherein the random access message is received from a user equipment (UE); processing a payload of the random access message, wherein an outcome of processing the payload is either successfully decoding the payload or failing to decode the payload; and transmitting, based at least in part on detecting the preamble and the outcome of processing the payload, a random access response associated with the two-step random access procedure, wherein the random access response includes an uplink group grant, and an indication of a type of the uplink group grant, for a plurality of UEs including the UE, wherein preamble transmissions of the plurality of UEs share a time and frequency occasion.

In some aspects, a base station for wireless communication may include memory and one or more processors operatively coupled to the memory. The memory and the one or more processors may be configured to detect a preamble of a random access message associated with a two-step random access procedure, wherein the random access message is received from a user equipment (UE); process a payload of the random access message, wherein an outcome of processing the payload is either successfully decoding the payload or failing to decode the payload; and transmit, based at least in part on detecting the preamble and the outcome of processing the payload, a random access response associated with the two-step random access procedure, wherein the random access response includes an uplink group grant, and an indication of a type of the uplink group grant, for a plurality of UEs including the UE, wherein preamble transmissions of the plurality of UEs share a time and frequency occasion.

In some aspects, a non-transitory computer-readable medium may store one or more instructions for wireless communication. The one or more instructions, when executed by one or more processors of a base station, may cause the one or more processors to: detect a preamble of a random access message associated with a two-step random access procedure, wherein the random access message is received from a user equipment (UE); process a payload of the random access message, wherein an outcome of processing the payload is either successfully decoding the payload or failing to decode the payload; and transmit, based at least in part on detecting the preamble and the outcome of processing the payload, a random access response associated with the two-step random access procedure, wherein the random access response includes an uplink group grant, and an indication of a type of the uplink group grant, for a plurality of UEs including the UE, wherein preamble transmissions of the plurality of UEs share a time and frequency occasion.

In some aspects, an apparatus for wireless communication may include means for detecting a preamble of a random access message associated with a two-step random access procedure, wherein the random access message is received from a user equipment (UE); means for processing a payload of the random access message, wherein an outcome of processing the payload is either successfully decoding the payload or failing to decode the payload; and means for transmitting, based at least in part on detecting the preamble and the outcome of processing the payload, a random access response associated with the two-step random access procedure, wherein the random access response includes an uplink group grant, and an indication of a type of the uplink group grant, for a plurality of UEs including the UE, wherein preamble transmissions of the plurality of UEs share a time and frequency occasion.

In some aspects, a method of wireless communication, performed by a base station, may include constructing an uplink group grant for a plurality of UEs performing a two-step random access procedure, wherein preambles or payloads of random access messages provided by the plurality of UEs have been detected by the base station; and transmitting a random access response associated with the two-step random access procedure, wherein the random access response includes the uplink group grant and an indication of a type of the uplink group grant.

In some aspects, a method of wireless communication, performed by a UE, may include transmitting a preamble and a payload of a random access message associated with a two-step random access procedure; and receiving a random access response associated with the two-step random access procedure after transmitting the preamble and the payload of the random access message, wherein the random access response includes an uplink group grant for a plurality of UEs including the UE, and wherein the random access response includes an indication of a type of the uplink group grant.

In some aspects, a base station for wireless communication may include a memory and one or more processors operatively coupled to the memory. The memory and the one or more processors may be configured to construct an uplink group grant for a plurality of UEs performing a two-step random access procedure, wherein preambles or payloads of random access messages provided by the plurality of UEs have been detected by the base station; and transmit a random access response associated with the two-step random access procedure, wherein the random access response includes the uplink group grant and an indication of a type of the uplink group grant.

In some aspects, a UE for wireless communication may include a memory and one or more processors operatively coupled to the memory. The memory and the one or more processors may be configured to transmit a preamble and a payload of a random access message associated with a two-step random access procedure; and receive a random access response associated with the two-step random access procedure after transmitting the preamble and the payload of the random access message, wherein the random access response includes an uplink group grant for a plurality of UEs including the UE, and wherein the random access response includes an indication of a type of the uplink group grant.

In some aspects, a non-transitory computer-readable medium may store one or more instructions for wireless communication. The one or more instructions, when executed by one or more processors of a base station, may cause the one or more processors to construct an uplink group grant for a plurality of UEs performing a two-step random access procedure, wherein preambles or payloads of random access messages provided by the plurality of UEs have been detected by the base station; and transmit a random access response associated with the two-step random access procedure, wherein the random access response includes the uplink group grant and an indication of a type of the uplink group grant.

In some aspects, a non-transitory computer-readable medium may store one or more instructions for wireless communication. The one or more instructions, when executed by one or more processors of a UE, may cause the one or more processors to transmit a preamble and a payload of a random access message associated with a two-step random access procedure; and receive a random access response associated with the two-step random access procedure after transmitting the preamble and the payload of the random access message, wherein the random access response includes an uplink group grant for a plurality of UEs including the UE, and wherein the random access response includes an indication of a type of the uplink group grant.

In some aspects, an apparatus for wireless communication may include means for constructing an uplink group grant for a plurality of UEs performing a two-step random access procedure, wherein preambles or payloads of random access messages provided by the plurality of UEs have been detected by the base station; and means for transmitting a random access response associated with the two-step random access procedure, wherein the random access response includes the uplink group grant and an indication of a type of the uplink group grant.

In some aspects, an apparatus for wireless communication may include means for transmitting a preamble and a payload of a random access message associated with a two-step random access procedure; and means for receiving a random access response associated with the two-step random access procedure after transmitting the preamble and the payload of the random access message, wherein the random access response includes an uplink group grant for a plurality of UEs including the apparatus, and wherein the random access response includes an indication of a type of the uplink group grant.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
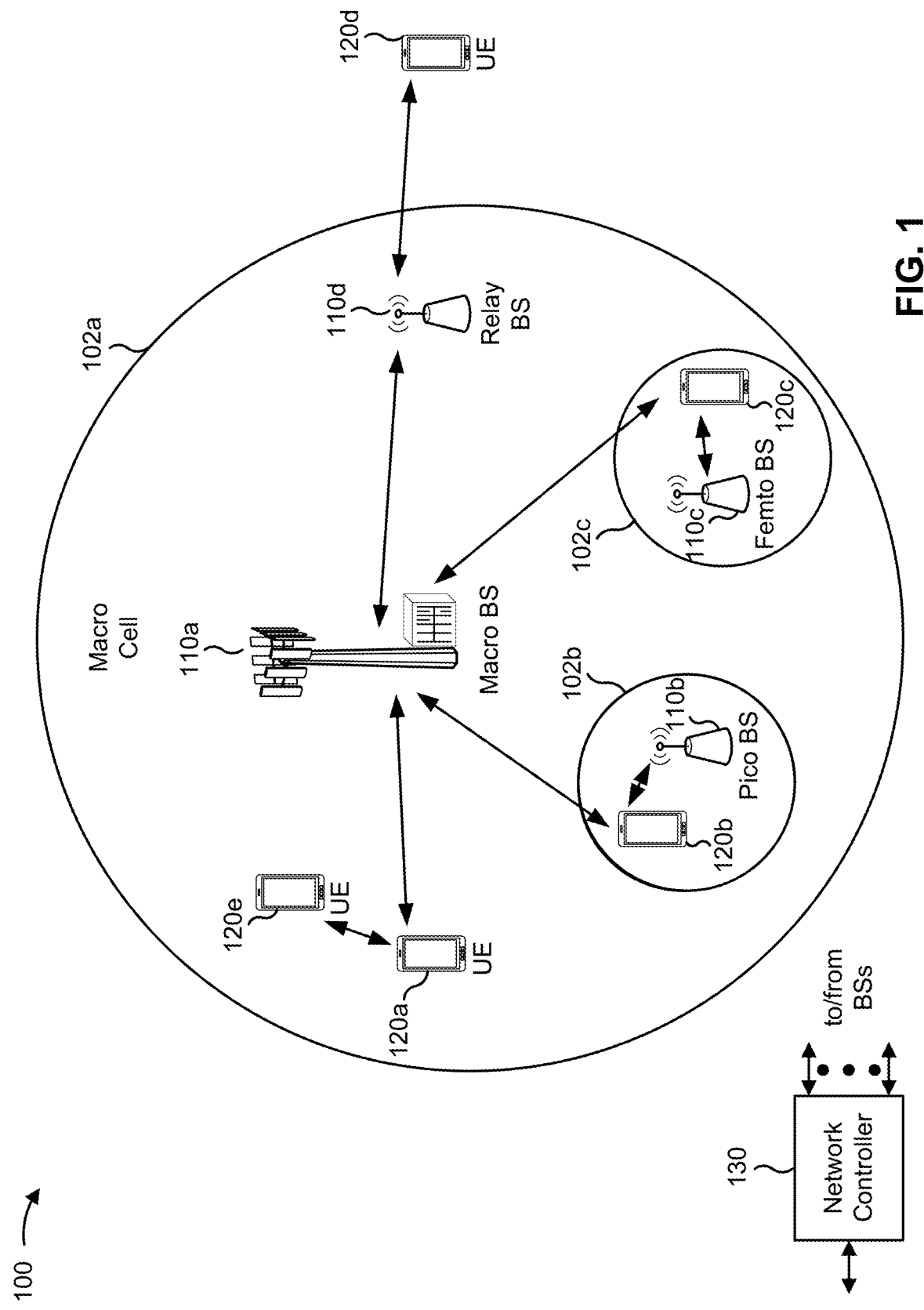
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
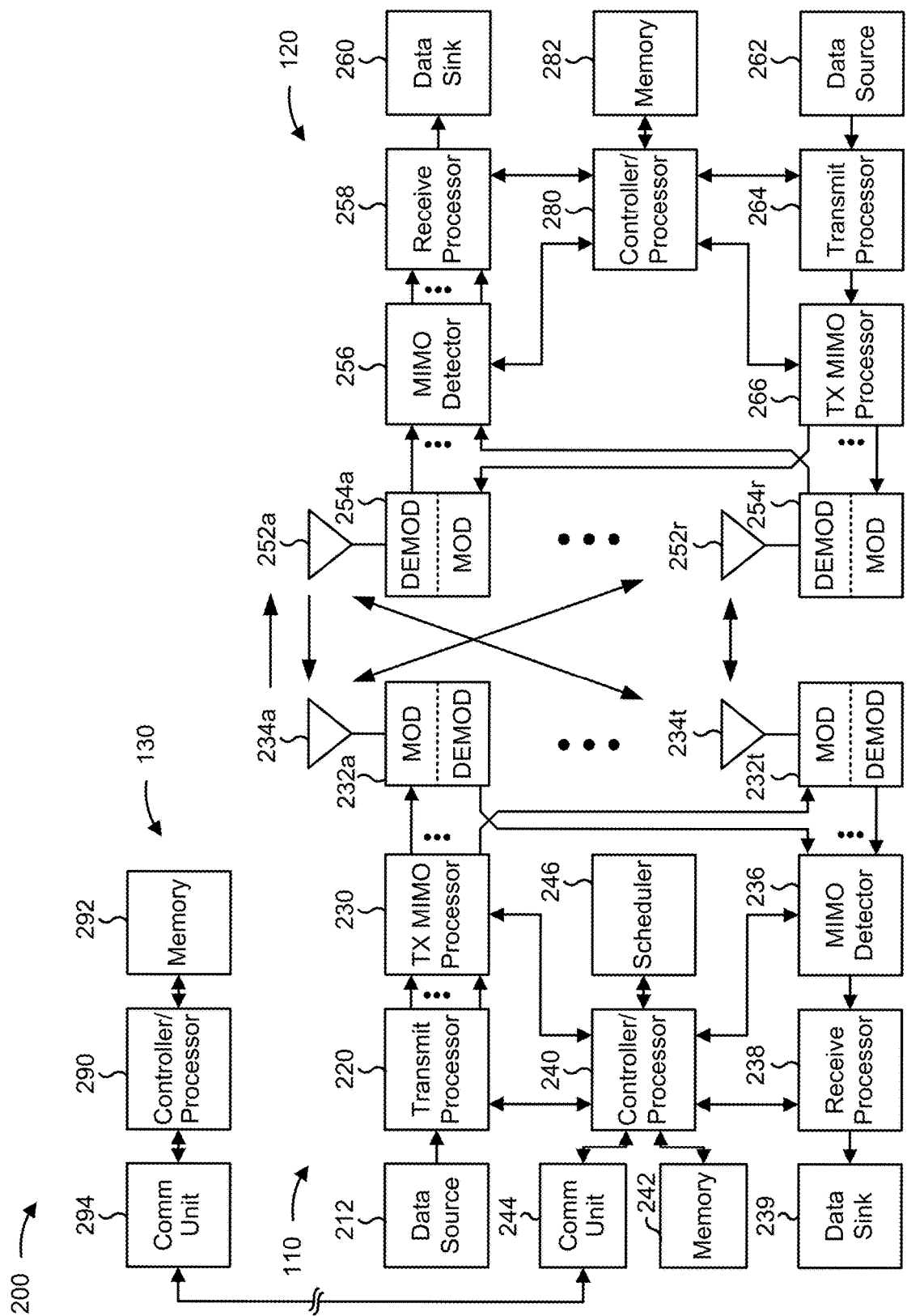
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques for a random access response for a two-step random access procedure, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for detecting a preamble of a random access message associated with a two-step random access procedure, wherein the random access message is received from UE 120; means for processing a payload of the random access message, wherein an outcome of processing the payload is either successfully decoding the payload or failing to decode the payload; and means for transmitting, based at least in part on detecting the preamble and the outcome of processing the payload, a random access response associated with the two-step random access procedure, wherein the random access response includes an uplink group grant, and an indication of a type of the uplink group grant, for a plurality of UEs including UE 120, wherein preamble transmissions of the plurality of UEs share a time and frequency occasion; and/or the like. In some aspects, such means may include one or more components of base station 110 described in connection with FIG. 2.

In some aspects, a base station 110 may include means for constructing an uplink group grant for a plurality of UEs 120 performing a two-step random access procedure, wherein preambles or payloads of random access messages provided by the plurality of UEs 120 have been detected by the base station; means for transmitting a random access response associated with the two-step random access procedure, wherein the random access response includes the uplink group grant and an indication of a type of the uplink group grant; and/or the like. In some aspects, such means may include one or more components of base station 110 described in connection with FIG. 2.

In some aspects, UE 120 may include means for transmitting a preamble and a payload of a random access message associated with a two-step random access procedure; means for receiving a random access response, associated with the two-step random access procedure, including an uplink group grant and an indication of a type of the uplink group grant for a plurality of UEs including UE 120; means for transmitting an uplink communication on a set of shared time-frequency resources based at least in part on the uplink group grant; and/or the like. In some aspects, such means may include one or more components of UE 120 described in connection with FIG. 2.

In some aspects, a UE 120 may include means for transmitting a preamble and a payload of a random access message associated with a two-step random access procedure; means for receiving a random access response associated with the two-step random access procedure after transmitting the preamble and the payload of the random access message, wherein the random access response includes an uplink group grant for a plurality of UEs including the UE, and wherein the random access response includes an indication of a type of the uplink group grant; and/or the like. In some aspects, such means may include one or more components of UE 120 described in connection with FIG. 2.

As indicated above, FIG. 2 is provided as an example. Other examples may differ from what is described with regard to FIG. 2.

A two-step random access channel (RACH) procedure includes two steps (rather than four steps, as in a traditional four-step RACH procedure). In the two-step RACH procedure, a UE transmits a random access message (referred to as msgA) that includes a (e.g., randomly selected) preamble and a payload (e.g., a physical uplink shared channel (PUSCH) payload). In an ideal case, a base station successfully detects the preamble and successfully decodes the payload, and transmits a random access response (referred to as msgB) to the UE. The random access response includes a physical downlink control channel (PDCCH) communication and a physical downlink shared channel (PDSCH) payload, where the PDCCH communication identifies resources of the PDSCH payload that carry information for the UE. The PDSCH payload can include, for example, contention resolution information for the UE, a cell radio network temporary identifier (C-RNTI) for the UE, a timing advance (TA) command for the UE, and/or the like. The random access response associated with the two-step RACH procedure in this ideal case (i.e., when the base station detects the msgA preamble and decodes the msgA payload) is referred to herein as a success random access response (SuccessRAR).

In some cases, however, the base station may not detect the preamble of the random access message and/or may fail to decode the payload of the random access message. Such a situation may arise due to, for example, channel impairments, contention-based multiple access, and/or the like. Thus, in order to improve reliability of the two-step RACH procedure, fallback to a transmission of another random access message (e.g., a message similar to msg3 in the traditional four-step RACH procedure) and/or retransmission of the random access message (e.g., retransmission of msgA) may be supported.

In a case in which the base station successfully detects the preamble of the random access message but fails to decode the payload of the random access message, the base station may send a random access response including a random access preamble identifier (RAPID) associated with the detected preamble, an uplink grant for the UE, a TA command for the UE, and a temporary C-RNTI (TC-RNTI) for the UE. The random access response associated with the two-step RACH procedure in the case where the preamble is detected but the payload is not successfully decoded is herein referred to as a fallback random access response (FallbackRAR). Generally, when a UE performing the two-step RACH procedure receives a fallback random access response, the UE falls back to the four-step RACH procedure and, based on receiving the fallback random access response, transmits another random access message (e.g., msg3). Here, the contents of the other random access message can be similar to or different from that of the payload of the random access message transmitted by the UE during the two-step RACH attempt. Notably, the UE need not transmit the preamble with the other random access message since the base station has already detected the preamble. In a case in which the base station does not detect the preamble of the random access message, the base station may send back-off indication information in a random access response medium access control (MAC) sub-header (e.g., such that the UE can retransmit the random access message at a later time).

As indicated above, in the conventional two-step RACH procedure, the base station includes an uplink grant for a UE (e.g., a single UE uplink grant) in a given fallback random access response, but does not include any uplink grant in a success random access response. This uplink grant design for two-step RACH may cause inefficiencies in terms of, for example, spectral efficiency, power consumption, and signaling overhead.

Some aspects described herein provide uplink grant design improvements for the two-step RACH procedure. For example, in some aspects, the uplink grant included in a fallback random access response may be an uplink group grant for a plurality of UEs (e.g., in order to allow the plurality of UEs to share uplink resources for further uplink transmissions). As another example, in some aspects, an uplink grant may be included in a success random access response (e.g., in order to allow a UE to send additional uplink data without a need to request uplink resources). Here, the uplink grant can be a single-UE grant or can be an uplink group grant for a plurality of UEs. As still another example, an uplink group grant can be used by UEs for which different random access message processing outcomes were reached (e.g., a UE for which decoding of a payload of a msgA failed and a second UE for which decoding of a payload of a msgA succeeded, where the second UE needs to transmit additional uplink data). As described below, the uplink grant design aspects described herein provide higher spectral efficiency and reduce power consumption, while reducing signaling overhead.

Figure 3A:
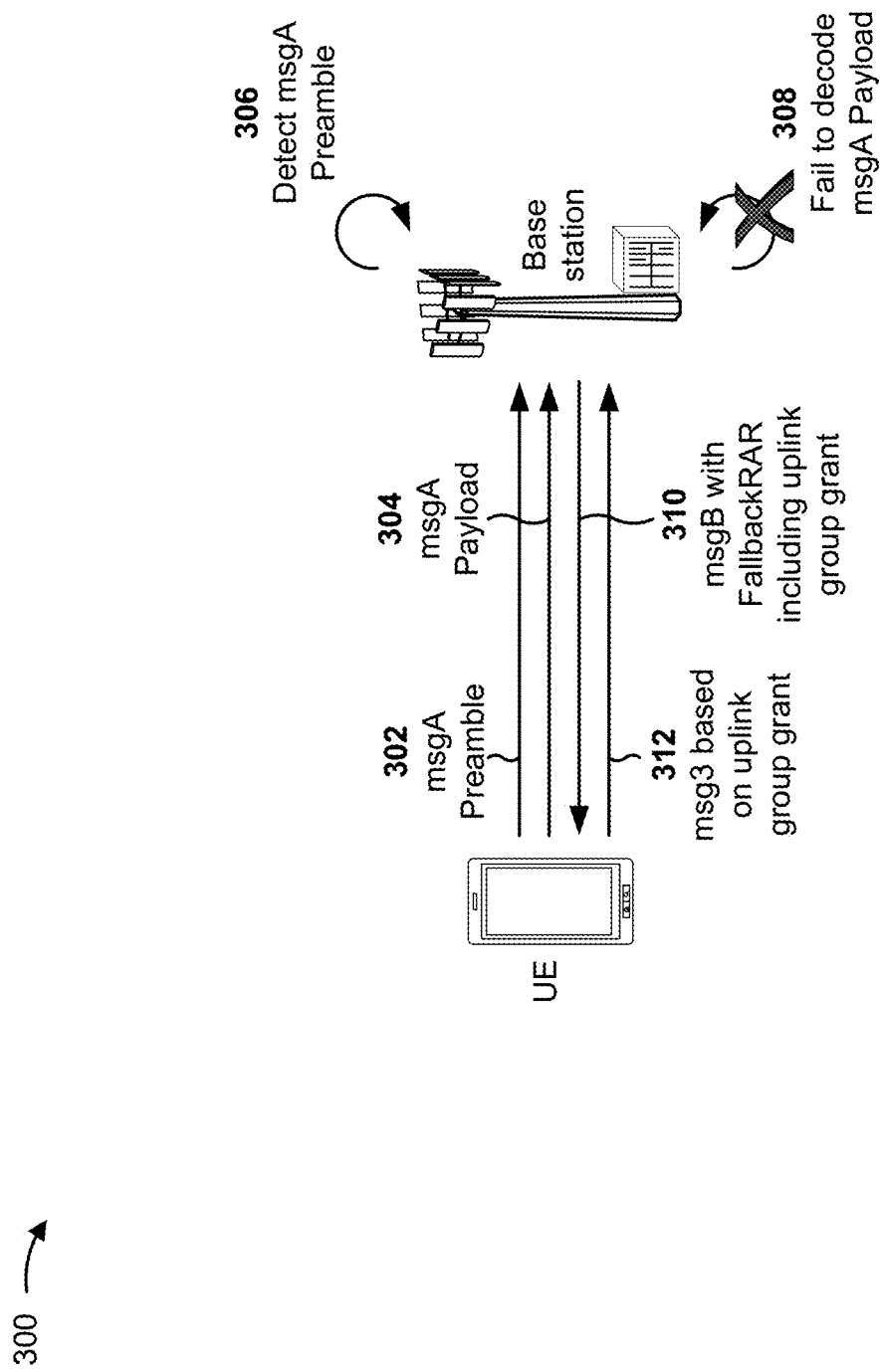
FIGS. 3A-3C are diagrams illustrating examples associated with a random access response for a two-step random access procedure, in accordance with various aspects of the present disclosure.
Figure 3B:
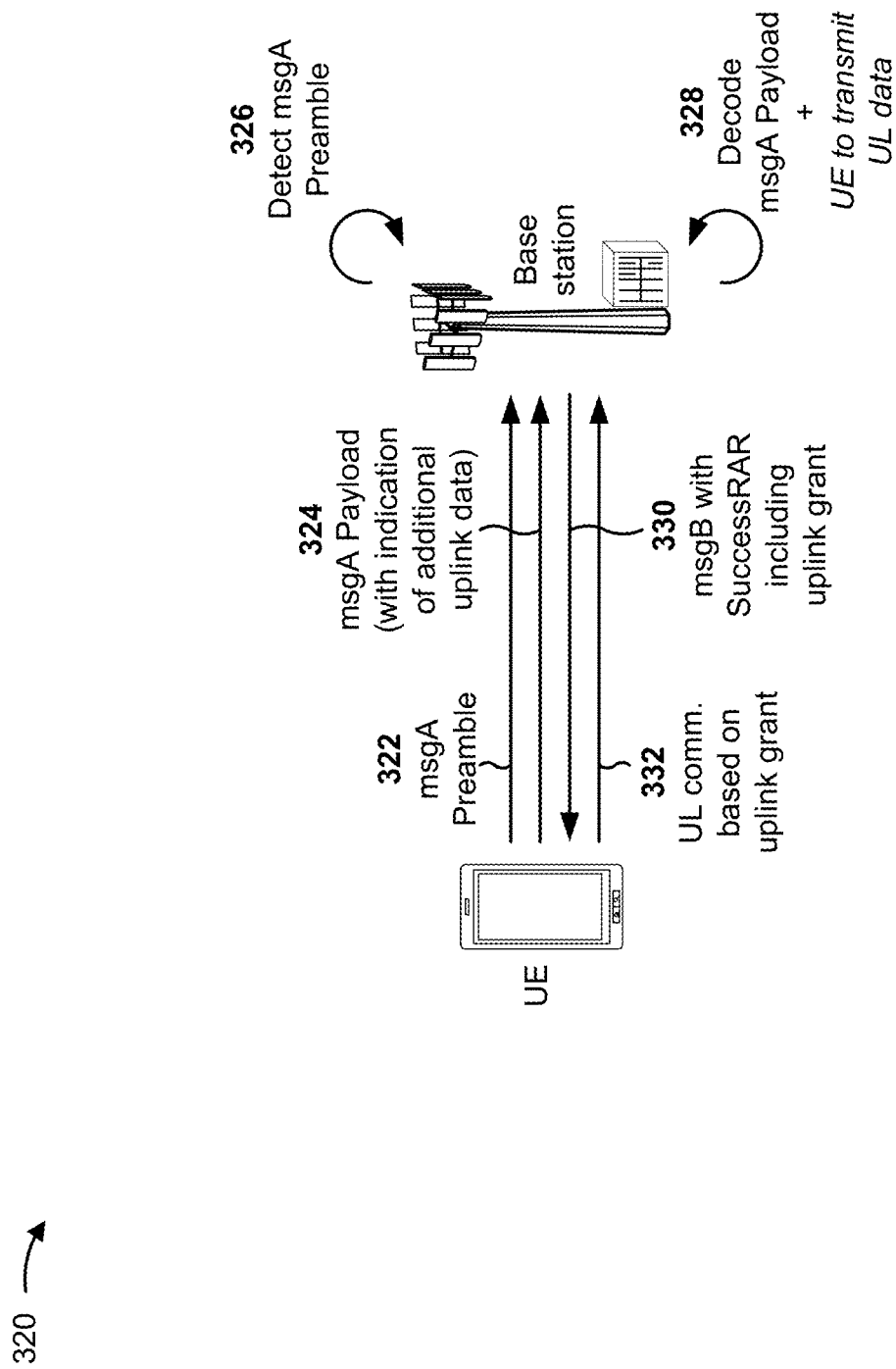
Figure 3C:
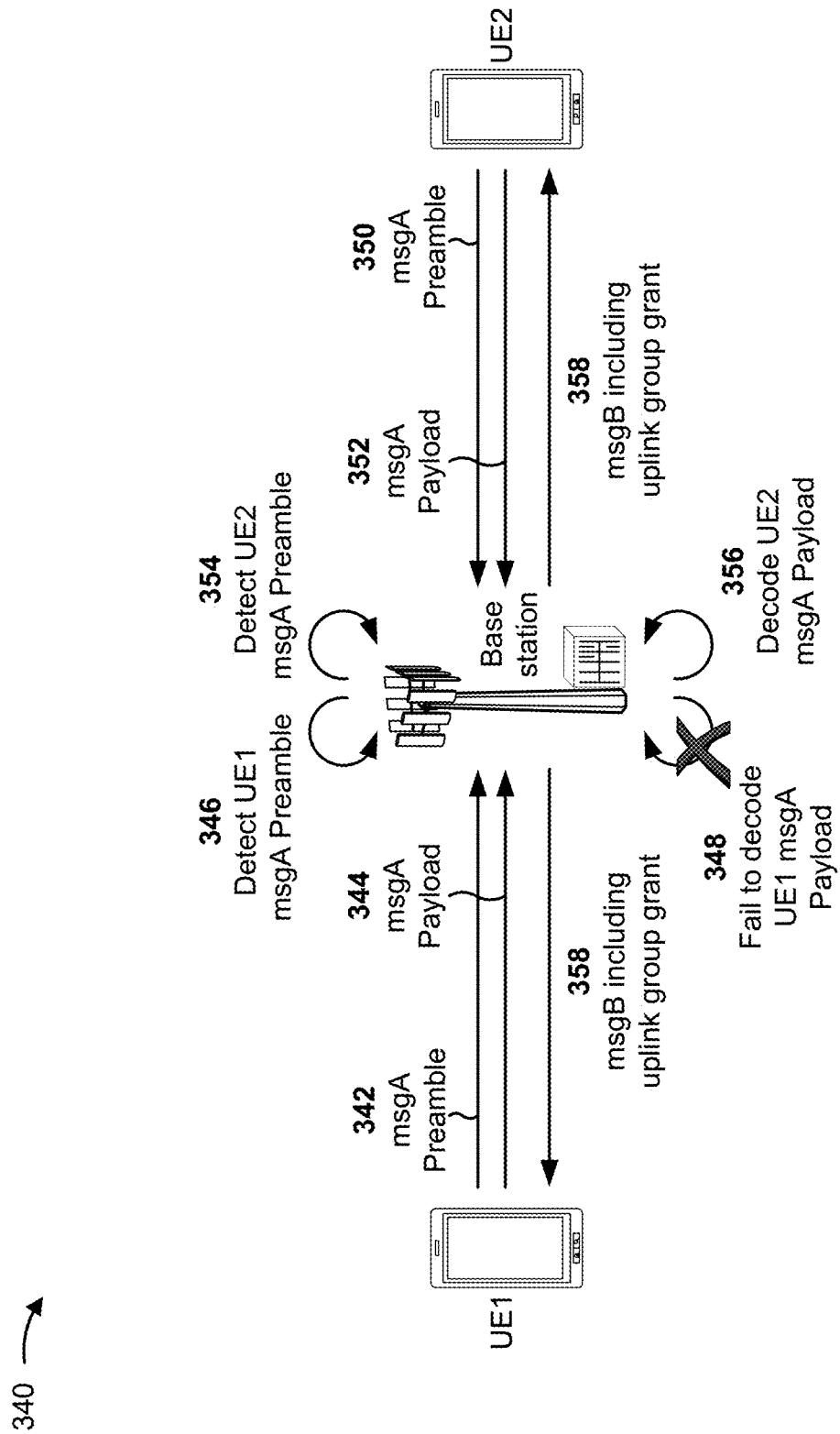

FIGS. 3A-3C are diagrams illustrating examples associated with a random access response for a two-step random access procedure, in accordance with various aspects of the present disclosure. For the purposes of the examples shown in FIGS. 3A-3C, a UE (e.g., UE 120) is configured to use a two-step RACH procedure in association with connecting to a base station (e.g., base station 110).

FIG. 3A is a diagram of an example 300 in which an uplink grant included in a fallback random access response is an uplink group grant associated with a plurality of UEs including the UE. As shown in FIG. 3A, and by reference numbers 302 and 304, the UE may transmit a preamble of a random access message associated with the two-step RACH procedure (msgA Preamble) and a payload of the random access message associated with the two-step RACH procedure (msgA Payload).

As shown by reference number 306, the base station detects the preamble of the random access message. However, as shown by reference number 308, the base station fails to decode the payload of the random access message.

As shown by reference number 310, based at least in part on detecting the preamble and failing to decode the payload, the base station may transmit a random access response, associated with the two-step random access procedure, that includes an uplink group grant for a plurality of UEs including the UE. In other words, the base station may transmit a msgB with a fallback random access response that includes an uplink group grant. In some aspects, the fallback random access response may include a set of K (K≥1) RAPIDs, each associated with a respective one of K UEs for which preambles were detected, but payloads were not successfully decoded.

The uplink group grant is an uplink grant for a plurality of UEs, meaning that the plurality of UEs may share resources of the uplink grant in association with additional uplink transmissions. In some aspects, the uplink group grant may indicate a set of resources and a modulation and coding scheme (MCS) to be used by the plurality of UEs for transmitting other random access messages (e.g., a set of resources and an MCS to be used by the UEs for transmitting a msg3).

In some aspects, a demodulation reference signal (DMRS) resource configuration (e.g., port and/or sequences) for the plurality of UEs may be explicitly indicated in the uplink group grant. Alternatively, a DMRS resource configuration for the plurality of UEs may be implicitly indicated by a mapping rule associated with preamble resource indices and DMRS resource indices configured for the plurality of UEs by the base station (e.g., a mapping rule between a preamble resource index and a DMRS resource index, wherein the preamble resource indexing can include both RACH occasions (ROs) and sequences, and the DMRS resource indexing can include both antenna ports and sequences).

In some aspects, the base station may transmit a timing advance (TA) command, associated with the UE, and a temporary cell radio network temporary identifier (TC-RNTI), associated with the UE, separately from the uplink group grant (e.g., such that each of the plurality of UEs can receive a respective TA command and TC-RNTI).

In some aspects, the uplink group grant may be the only uplink group grant included in the random access response. In other words, in some cases, the random access response transmitted by the base station may include a single uplink group grant for the plurality of UEs.

Alternatively, in some aspects, the random access response may include multiple uplink group grants. For example, the uplink group grant may be a first uplink group grant and the plurality of UEs may be a first plurality of UEs for which preambles were detected but payloads were not successfully decoded. In this example, the random access response may further include a second uplink group grant associated with a second plurality of UEs (e.g., a separate uplink group grant for another plurality of UEs for which preambles were detected but payloads were not successfully decoded). In some aspects, the base station may partition a group of UEs into the first plurality of UEs and the second plurality of UEs based at least in part on, for example, proximities of timing offsets associated with the group of UEs or UE statuses associated with the group of UEs (e.g., derived from rules for msgA preamble, RO selection, and/or the like).

In some aspects, the random access response may further include a single-UE uplink grant for another UE. For example, the random access response may include the uplink group grant for the plurality of UEs, and may further include a single-UE grant for another UE (e.g., a UE not included in the plurality of UEs).

As further shown in FIG. 3A, and by reference number 312, the UE may receive the random access response including the uplink group grant for the plurality of UEs, and may transmit an uplink communication (e.g., msg3) based at least in part on the uplink group grant. Here, the UE may individually adjust the timing offset (e.g., based on the TA command associated with the UE) and individually scramble PUSCH bits, but may use the set of resources and MCS indicated by the uplink group grant (i.e., the same set of resources and the same MCS as used by other UEs of the plurality of UEs).

Here, use of the uplink group grant improves spectral efficiency since multiple UEs can use the same set of resources and MCS in association with transmitting uplink communications during the two-step RACH procedure. Moreover, through use of an uplink group grant (rather than multiple single-UE grants) power consumption is decreased at the base station and signaling overhead is reduced.

FIG. 3B is a diagram of an example 320 in which an uplink grant is included in a success random access response. As shown in FIG. 3B, and by reference numbers 322 and 324, the UE may transmit a preamble of a random access message associated with the two-step RACH procedure (msgA Preamble) and a payload of the random access message associated with the two-step RACH procedure (msgA Payload). As indicated by reference number 324, the payload of the random access message may include an indication that the UE needs to transmit additional uplink data (e.g., that the UE has uplink data ready for transmission in addition to the uplink data included in the payload). In some aspects, the indication may in the form of a buffer status report (BSR) included in the payload of the random access message, a scheduling request (SR) included in the payload of the random access message, and/or the like.

As shown by reference number 326, the base station detects the preamble of the random access message. As shown by reference number 328, the base station decodes the payload of the random access message. As further shown by reference number 328, the base station may determine that the UE needs to transmit the additional uplink data. In some aspects, the base station may determine that the UE needs to transmit additional uplink data based at least in part on the indication in the payload of the random access message.

As shown by reference number 330, based at least in part on determining that the UE needs to transmit additional uplink data, the base station may transmit a random access response, associated with the two-step random access procedure, that includes an uplink grant for the UE. In other words, the base station may transmit a success random access response that includes an uplink grant.

In some aspects, the uplink grant may be a single-UE uplink grant for the UE (e.g., an uplink grant specific to the UE). In such a case, in some aspects, the random access response may further include an uplink group grant for a plurality of UEs other than the UE (e.g., a plurality of other UEs for which payload decoding was successful, where each of the plurality of UEs needs to transmit additional uplink data).

In some aspects, the uplink grant may be an uplink group grant for a plurality of UEs including the UE (e.g., a plurality of UEs for which payload decoding was successful, where each of the plurality of UEs needs to transmit additional uplink data). In some aspects, the grouping of the plurality of UEs may be based at least in part on a reference signal received power (RSRP) measurement, a channel state information (CSI) report, beam management, quality of service (QoS) handling, a positioning-related measurement; and/or the like. In other words, in some aspects, the base station may group UEs to be associated with a given uplink group grant based at least in part on one or more measurements and/or characteristics ascertained from payloads of random access messages transmitted by each of the UEs. The information carried and/or indicated by the uplink group grant is similar to that described above in association with FIG. 3A. In some aspects, the uplink group grant may be the only uplink group grant included in the random access response, or may be one of a plurality of uplink group grants included in the random access response. Further, in a case in which the uplink grant is an uplink group grant, the random access response may further include a single-UE uplink grant for another UE, in some aspects.

As further shown in FIG. 3B, and by reference number 332, the UE may receive the random access response including the uplink grant for the UE, and may transmit an uplink communication (e.g., including the additional uplink data) based at least in part on the uplink grant. Here, if the uplink grant is an uplink group grant, the UE may individually adjust the timing offset (e.g., based on a TA command associated with the UE) and scramble PUSCH bits, but may use the set of resources and MCS indicated by the uplink group grant (i.e., the same set of resources and the same MCS as used by other UEs of the plurality of UEs).

Here, use of the uplink grant in the success random access response can improve spectral efficiency since multiple UEs may use the same set of resources and MCS in association with transmitting uplink communications. Further, by providing the uplink grant in the success random access response (rather than waiting for the UE to provide an explicit request for uplink resources), power consumption is decreased at the UE and the base station, and signaling overhead is reduced.

FIG. 3C is a diagram of an example 340 in which an uplink grant included in a fallback random access response is an uplink group grant associated with a plurality of UEs including a UE for which decoding of a payload of a random access message failed and a UE for which decoding of a payload of a random access message succeeded.

In some aspects, the base station may identify a plurality of UEs to which an uplink group grant is to be transmitted in association with a two-step random access procedure, where the plurality of UEs includes a first UE for which decoding of a payload of a first random access message failed, and a second UE for which decoding of a payload of a second random access message succeeded.

For example, as shown by reference numbers 342 and 344, the first UE (UE1) may transmit a preamble of a first random access message and a payload of the first random access message. As shown by reference number 346, the base station detects the preamble of the first random access message. However, as shown by reference number 348, the base station fails to decode the payload of the first random access message. Further, as shown by reference numbers 350 and 352, the second UE (UE2) may transmit a preamble of a second random access message and a payload of the second random access message. As shown by reference number 354, the base station detects the preamble of the second random access message and, as shown by reference number 356, successfully decodes the payload of the second random access message. In this example, the base station has identified a plurality of UEs to which an uplink group grant is to be transmitted in association with a two-step random access procedure, where the plurality of UEs includes the first UE (e.g., UE1 for which decoding of the payload of the first random access message failed), and the second UE (e.g., UE2 for which decoding of the payload of the second random access message succeeded).

As shown by reference number 358, based at least in part on identifying the plurality of UEs, the base station may transmit a random access response, associated with the two-step random access procedure, that includes an uplink group grant for a plurality of UEs including the first UE and the second UE. Notably, in this case, the uplink group grant is to be shared by the plurality of UEs with different msgA processing outcomes. In other words, the uplink group grant can be shared by the first UE, for which payload decoding failed (e.g., in order to transmit msg3), and the second UE, for which payload decoding succeeded (e.g., in order to transmit an additional uplink communication). Here, a single uplink group grant is needed, rather than separate uplink grants being needed in a fallback random access response and a success random access response.

In some aspects, the base station may transmit, and the plurality of UEs may receive, the random access response in a set of resources independent from resources corresponding to a fallback random access response and resources corresponding to a success random access response. Alternatively, in some aspects, the base station may transmit, and the plurality of UEs may receive, the uplink group grant in a set of resources shared by a fallback random access response and a success random access response.

In some aspects, the information carried and/or indicated by the uplink group grant may be similar to that described above in association with FIG. 3A. In some aspects, the uplink group grant may be the only uplink group grant included in the random access response, or may be one of a plurality of uplink group grants included in the random access response. Further, in some aspects, the random access response may further include a single-UE uplink grant for another UE.

Similar to the manner described above, the first UE and the second UE may receive the random access response including the uplink group grant, and may transmit respective uplink communications (e.g., including msg3 and the additional uplink data, respectively) based at least in part on the uplink group grant.

Here, use of the uplink group grant improves spectral efficiency since multiple UEs can use the same set of resources and MCS in association with transmitting uplink communications during the two-step RACH procedure. Moreover, through use of an uplink group grant (rather than multiple single-UE grants) power consumption is decreased at the base station and signaling overhead is reduced. Further, by providing the uplink group grant in the random access response to UEs for which payload decoding is successful (rather than waiting for the UE to provide an explicit request for uplink resources), power consumption is decreased at the UE and the base station, and signaling overhead is reduced.

As indicated in the above examples, the base station may construct one or more uplink group grants for two-step RACH UEs whose preamble or payload have been detected. In some aspects, a status of an uplink group grant included in the random access response (e.g., msgB) may include information that identifies a number of group grants, information that identifies a type of the group grants, an indication of the type of a group grant, and/or the like. In some aspects, the indication of the type of the group grant may be based at least in part on a bitmap.

In some aspects, the random access response may include a random access response PDCCH (e.g., a msgB PDCCH) and a random access response PDSCH (e.g., a msgB PDSHC) (including a DMRS).

The random access response PDCCH may include downlink control information (DCI) with a cyclic redundancy check (CRC) attachment, in some aspects. In some aspects, the CRC may be masked with a group RNTI, such as a RA-RNTI. In some aspects, the random access response PDCCH can be configured within a common search space that is to be monitored by a group of two-step RACH UEs sharing the same RACH occasion for random access message (e.g., msgA) transmission. In some aspects, the DCI may carry the resource assignment for the random access response PDSCH. In some aspects, the DCI may carry an early indication for a type of the uplink group grant, such as an uplink group grant in a FallbackRAR, an uplink group grant in a SuccessRAR, a shared uplink group grant, or the like.

In some aspects, the random access response PDSCH may include a MAC packet data unit (PDU). In some aspects, the MAC PDU can carry at least a FallbackRAR and a SuccessRAR, where an uplink group grant can be included in the FallbackRAR, the SuccessRAR, or one or more other fields of the MAC PDU. In some aspects, an uplink group grant field may include at least a common time-frequency resource allocation for subsequent uplink transmissions (e.g., PUSCH transmissions). In some aspects, the uplink group grant field also include a MCS, a PUSCH hopping flag, a DMRS resource configuration, and/or a common information for power control and beam management.

As indicated above, FIGS. 3A-3C are provided as examples. Other examples may differ from what is described with respect to FIGS. 3A-3C FIG. 4 is a diagram illustrating an example process 400 performed, for example, by a base station, in accordance with various aspects of the present disclosure. Example process 400 is an example where a base station (e.g., base station 110 and/or the like) performs operations associated with a random access response for a two-step RACH procedure.

Figure 4:
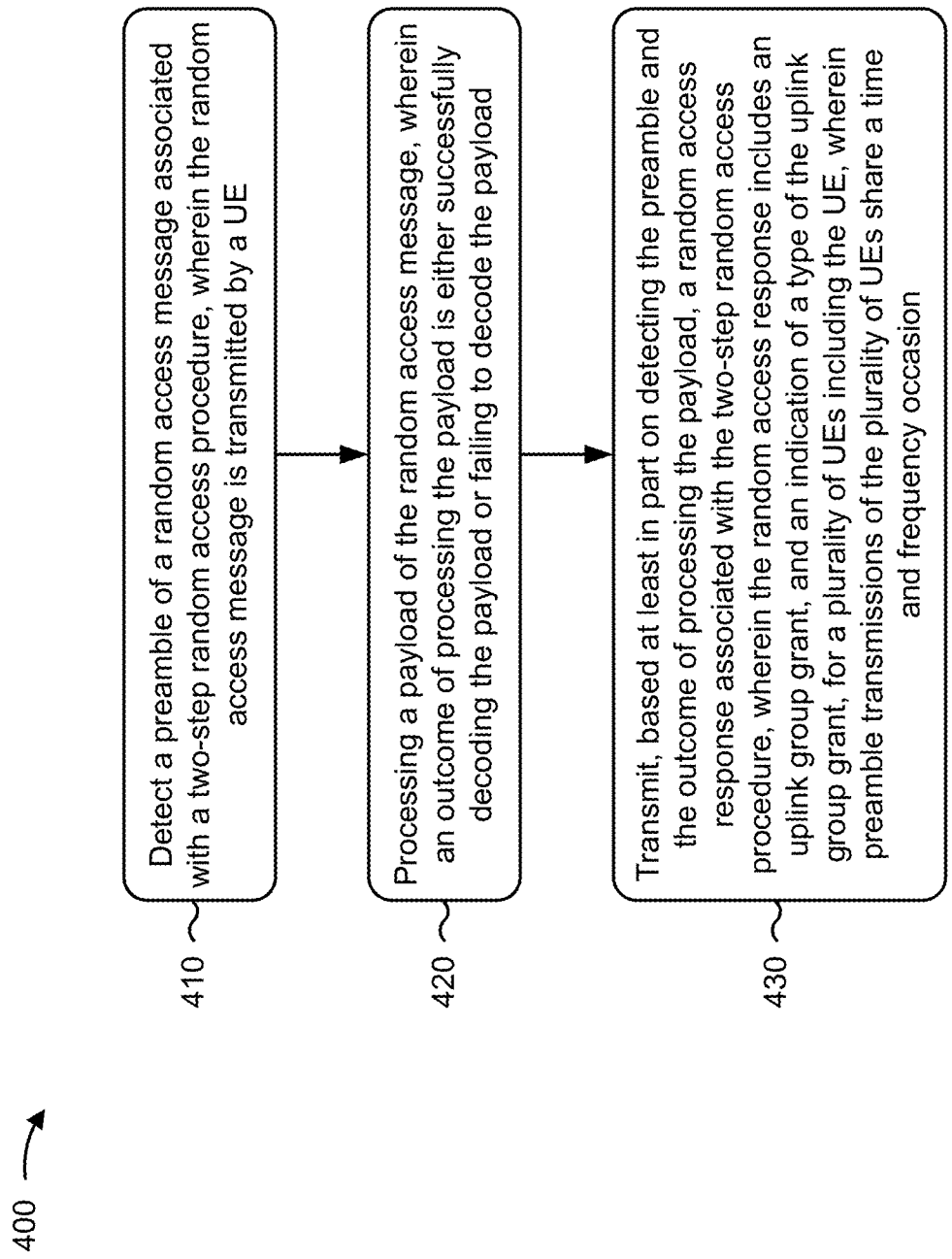
FIG. 4 is a diagram illustrating example processes performed, for example, by a base station, in accordance with various aspects of the present disclosure.

As shown in FIG. 4, in some aspects, process 400 may include detecting a preamble of a random access message associated with a two-step random access procedure (block 410). For example, the base station (e.g., using receive processor 238, controller/processor 240, memory 242, and/or the like) may detect a preamble of a random access message associated with a two-step random access procedure, as described above. In some aspects, the random access message is received from a UE (e.g., UE 120).

As further shown in FIG. 4, in some aspects, process 400 may include processing a payload of the random access message, wherein an outcome of processing the payload is either successfully decoding the payload or failing to decode the payload (block 420). For example, the base station (e.g., using receive processor 238, controller/processor 240, memory 242, and/or the like) may process a payload of the random access message, as described above. In some aspects, an outcome of processing the payload is either successfully decoding the payload or failing to decode the payload.

As further shown in FIG. 4, in some aspects, process 400 may include transmitting, based at least in part on detecting the preamble and the outcome of processing the payload, a random access response associated with the two-step random access procedure, wherein the random access response includes an uplink group grant, and an indication of a type of the uplink group grant, for a plurality of UEs including the UE (block 430). For example, the base station (e.g., using transmit processor 220, receive processor 238, controller/processor 240, memory 242, and/or the like) may transmit, based at least in part on detecting the preamble and the outcome of processing the payload, a random access response associated with the two-step random access procedure, as described above. In some aspects, the random access response includes an uplink group grant, and an indication of a type of the uplink group grant, for a plurality of UEs including the UE. In some aspects, preamble transmissions of the plurality of UEs share a time and frequency occasion.

Process 400 may include additional aspects, such as any single aspect or any combination of aspects described below and/or in connection with one or more other processes described elsewhere herein.

In a first aspect, when the outcome of processing the payload of the random access message is failing to decode the payload, the uplink group grant is included in the random access response based at least in part on failing to decode the payload.

In a second aspect, alone or in combination with the first aspect, the uplink group grant is included in a fallback random access response.

In a third aspect, alone or in combination with one or more of the first and second aspects, the UE is included in the plurality of UEs based at least in part on a timing offset associated with the UE or a UE status of the UE. For example, a group of UEs can be partitioned into two or more pluralities of UEs, including the plurality of UEs, based at least in part on proximities of timing offsets associated with the group of UEs or UE statuses associated with the group of UEs.

In a fourth aspect, alone or in combination with one or more of the first through third aspects, the uplink group grant indicates a common set of time-frequency resources, a modulation and coding scheme (MCS), common information for power control or beam management, and a physical uplink shared channel (PUSCH) hopping flag to be used by the plurality of UEs for transmitting other random access messages.

In a fifth aspect, alone or in combination with one or more of the first through fourth aspects, a demodulation reference signal (DMRS) resource configuration for the plurality of UEs is explicitly indicated in the uplink group grant.

In a sixth aspect, alone or in combination with one or more of the first through fifth aspects, a demodulation reference signal (DMRS) resource configuration for the plurality of UEs is implicitly indicated by a mapping rule associated with preamble resource indices and DMRS resource indices configured for the plurality of UEs by the base station.

In a seventh aspect, alone or in combination with one or more of the first through sixth aspects, a timing advance (TA) command, associated with the UE, and a temporary cell radio network temporary identifier (TC-RNTI), associated with the UE, are transmitted separately from the uplink group grant.

In an eighth aspect, alone or in combination with one or more of the first through seventh aspects, the uplink group grant is an only uplink group grant included in the random access response.

In a ninth aspect, alone or in combination with one or more of the first through eighth aspects, the uplink group grant is one of a plurality of uplink group grants included in the random access response.

In a tenth aspect, alone or in combination with one or more of the first through ninth aspects, the random access response further includes a single-UE uplink grant for another UE.

In an eleventh aspect, alone or in combination with one or more of the first through tenth aspects, the outcome of processing the payload of the random access message is successfully decoding the payload. Here the base station may determine, based at least in part on an indication in the payload, that the UE needs to transmit additional uplink data.

In a twelfth aspect, alone or in combination with one or more of the first through eleventh aspects, the uplink group grant is included in a success random access response.

In a thirteenth aspect, alone or in combination with one or more of the first through twelfth aspects, the indication is provided via a buffer status report (BSR).

In a fourteenth aspect, alone or in combination with one or more of the first through thirteenth aspects, the indication is provided via a scheduling request (SR).

In a fifteenth aspect, alone or in combination with one or more of the first through fourteenth aspects, the UE is grouped into the plurality of UEs based at least in part on at least one of: a reference signal received power (RSRP) measurement, a channel state information (CSI) report, beam management, quality of service (QoS) handling, or a positioning-related measurement.

In a sixteenth aspect, alone or in combination with one or more of the first through fifteenth aspects, the uplink group grant is transmitted in a resource independent from resources corresponding to a fallback random access response and resources corresponding to a success random access response.

In a seventeenth aspect, alone or in combination with one or more of the first through sixteenth aspects, the uplink group grant is transmitted in a set of resources shared by a fallback random access response and a success random access response.

In an eighteenth aspect, alone or in combination with one or more of the first through seventeenth aspects, the indication of the type of the uplink group grant is transmitted in a downlink control information (DCI) field of a random access response physical downlink control channel (PDCCH).

In a nineteenth aspect, alone or in combination with one or more of the first through eighteenth aspects, the indication of the type of the uplink group grant is based at least in part on a bitmap.

In a twentieth aspect, alone or in combination with one or more of the first through nineteenth aspects, the DCI is associated with a cyclic redundancy check (CRC). Here, the CRC may be masked by a group radio network temporary identifier (RNTI).

In a twenty first aspect, alone or in combination with one or more of the first through twentieth aspects, the random access response PDCCH is transmitted in a common search space.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
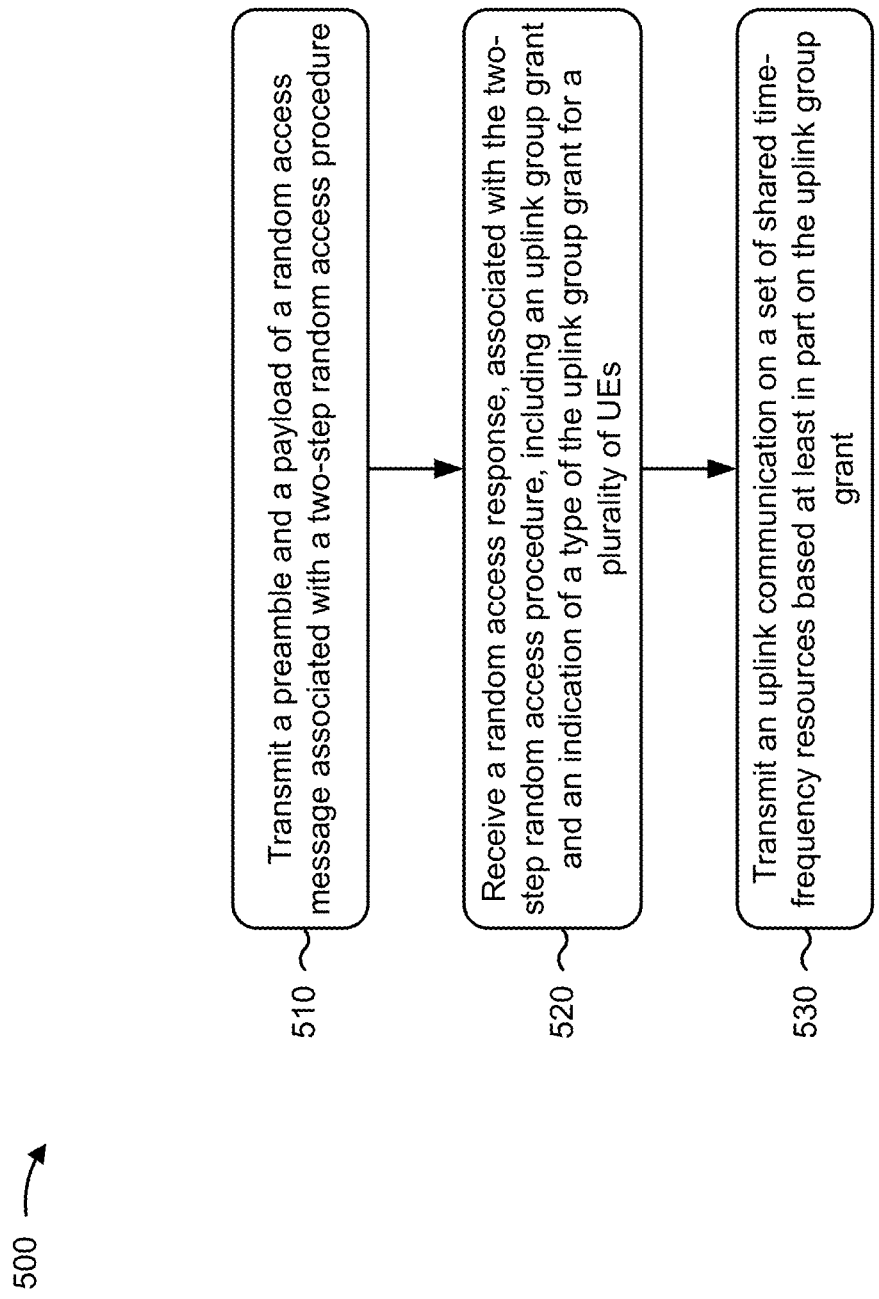
FIG. 5 is a diagram illustrating example processes performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with a random access response for a two-step RACH procedure.

As shown in FIG. 5, in some aspects, process 500 may include transmitting a preamble and a payload of a random access message associated with a two-step random access procedure (block 510). For example, the UE (e.g., using transmit processor 264, controller/processor 280, memory 282, and/or the like) may transmit a preamble and a payload of a random access message associated with a two-step random access procedure, as described above.

As further shown in FIG. 5, in some aspects, process 500 may include receiving a random access response, associated with the two-step random access procedure, including an uplink group grant and an indication of a type of the uplink group grant for a plurality of UEs including the UE (block 520). For example, the UE (e.g., using receive processor 258, controller/processor 280, memory 282, and/or the like) may receive a random access response, associated with the two-step random access procedure, including an uplink group grant and an indication of a type of the uplink group grant for a plurality of UEs including the UE, as described above.

As further shown in FIG. 5, in some aspects, process 500 may include transmitting an uplink communication on a set of shared time-frequency resources based at least in part on the uplink group grant (block 530). For example, the UE (e.g., using transmit processor 264, controller/processor 280, memory 282, and/or the like) may transmit an uplink communication on a set of shared time-frequency resources based at least in part on the uplink group grant, as described above.

Process 500 may include additional aspects, such as any single aspect or any combination of aspects described below and/or in connection with one or more other processes described elsewhere herein.

In a first aspect, the uplink group grant is included in the random access response based at least in part on a base station failing to decode the payload.

In a second aspect, alone or in combination with the first aspect, the uplink group grant is included in a fallback random access response.

In a third aspect, alone or in combination with one or more of the first and second aspects, the UE is included in the plurality of UEs based at least in part on a timing offset associated with the UE or a UE status of the UE.

In a fourth aspect, alone or in combination with one or more of the first through third aspects, the uplink group grant indicates a common set of time-frequency resources, a modulation and coding scheme (MCS), common information for power control or beam management, and a physical uplink shared channel (PUSCH) hopping flag to be used by the plurality of UEs for transmitting other random access messages.

In a fifth aspect, alone or in combination with one or more of the first through fourth aspects, a demodulation reference signal (DMRS) resource configuration for the plurality of UEs is explicitly indicated in the uplink group grant.

In a sixth aspect, alone or in combination with one or more of the first through fifth aspects, a demodulation reference signal (DMRS) resource configuration for the plurality of UEs is implicitly indicated by a mapping rule associated with preamble resource indices and DMRS resource indices configured for the plurality of UEs by the base station.

In a seventh aspect, alone or in combination with one or more of the first through sixth aspects, a timing advance (TA) command, associated with the UE, and a temporary cell radio network temporary identifier (TC-RNTI), associated with the UE, are received separately from the uplink group grant.

In an eighth aspect, alone or in combination with one or more of the first through seventh aspects, the uplink group grant is an only uplink group grant included in the random access response.

In a ninth aspect, alone or in combination with one or more of the first through eighth aspects, the uplink group grant is one of a plurality of uplink group grants included in the random access response.

In a tenth aspect, alone or in combination with one or more of the first through ninth aspects, the random access response further includes a single-UE uplink grant for another UE.

In an eleventh aspect, alone or in combination with one or more of the first through tenth aspects, an indication that the UE needs to transmit additional uplink data is included in the payload.

In a twelfth aspect, alone or in combination with one or more of the first through eleventh aspects, the uplink group grant is included in a success random access response.

In a thirteenth aspect, alone or in combination with one or more of the first through twelfth aspects, the indication is provided via a buffer status report (BSR).

In a fourteenth aspect, alone or in combination with one or more of the first through thirteenth aspects, the indication is provided via a scheduling request (SR).

In a fifteenth aspect, alone or in combination with one or more of the first through fourteenth aspects, the UE is grouped into the plurality of UEs based at least in part on at least one of: a reference signal received power (RSRP) measurement, a channel state information (CSI) report, beam management, quality of service (QoS) handling, or a positioning-related measurement.

In a sixteenth aspect, alone or in combination with one or more of the first through fifteenth aspects, the uplink group grant is received in a resource independent from resources corresponding to a fallback random access response and resources corresponding to a success random access response.

In a seventeenth aspect, alone or in combination with one or more of the first through sixteenth aspects, the uplink group grant is received in a set of resources shared by a fallback random access response and a success random access response.

In an eighteenth aspect, alone or in combination with one or more of the first through seventeenth aspects, the indication of the type of the uplink group grant is received in a downlink control information (DCI) field of a random access response physical downlink control channel (PDCCH) based at least in part on monitoring the random access response PDCCH.

In a nineteenth aspect, alone or in combination with one or more of the first through eighteenth aspects, the DCI is associated with a cyclic redundancy check (CRC). Here, the CRC may be de-masked with a group radio network temporary identifier (RNTI).

In a twentieth aspect, alone or in combination with one or more of the first through nineteenth aspects, the DCI is decoded to determine a resource assignment of a random access response physical downlink shared channel (PDSCH). Here, the indication of the type of the uplink group grant may be carried in the random access response PDSCH.

In a twenty first aspect, alone or in combination with one or more of the first through twentieth aspects, the random access response and the uplink group grant are decoded.

In a twenty second aspect, alone or in combination with one or more of the first through twenty first aspects, a timing advance (TA), a modulation and coding scheme (MCS), power control, beam management, and time-frequency resource allocation is applied in association with transmitting the uplink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
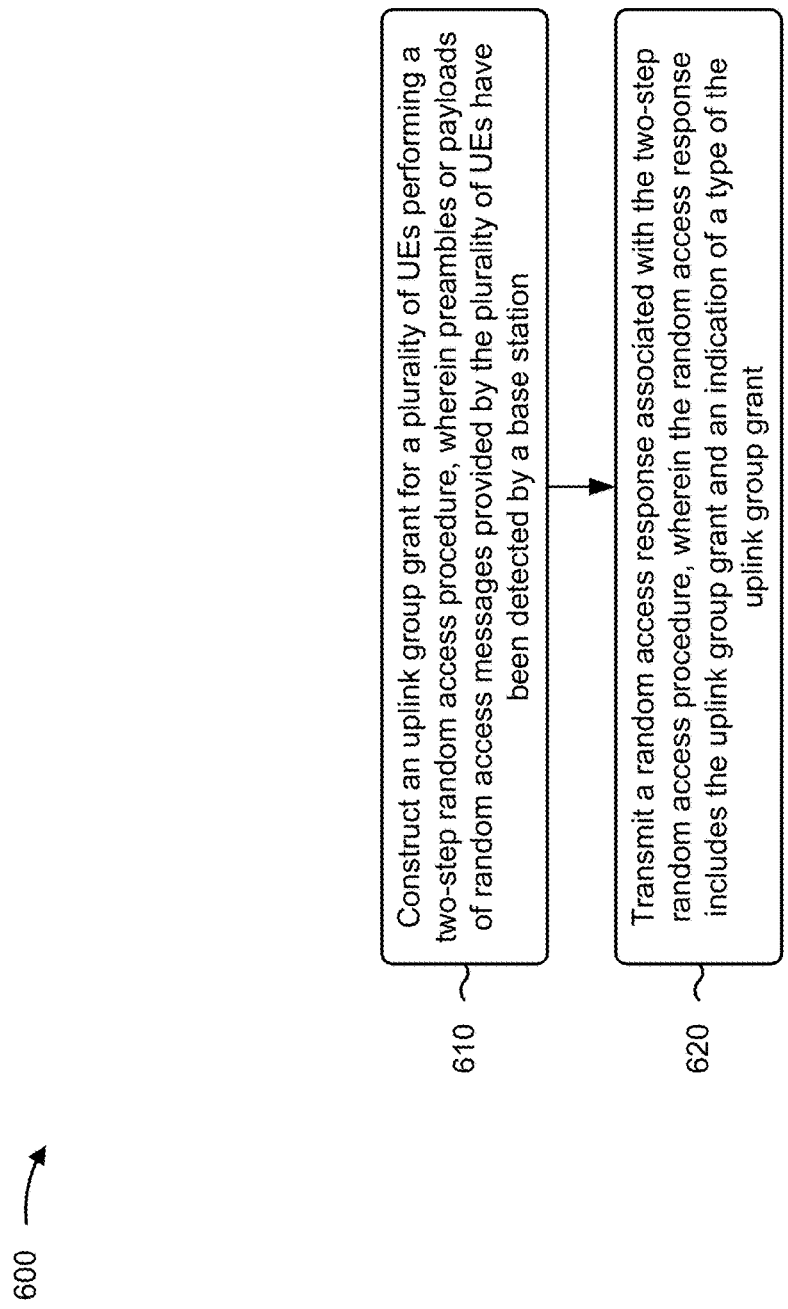
FIG. 6 is a diagram illustrating example processes performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with design considerations for a random access response for a two-step random access procedure.

As shown in FIG. 6, in some aspects, process 600 may include constructing an uplink group grant for a plurality of UEs performing a two-step random access procedure, wherein preambles or payloads of random access messages provided by the plurality of UEs have been detected by the base station (block 610). For example, the base station (e.g., using transmit processor 220, receive processor 238, controller/processor 240, memory 242, and/or the like) may construct an uplink group grant for a plurality of UEs (e.g., UEs 120) performing a two-step random access procedure, as described above. In some aspects, preambles or payloads of random access messages provided by the plurality of UEs have been detected by the base station.

As further shown in FIG. 6, in some aspects, process 600 may include transmitting a random access response associated with the two-step random access procedure, wherein the random access response includes the uplink group grant and an indication of a type of the uplink group grant (block 620). For example, the base station (e.g., using transmit processor 220, controller/processor 240, memory 242, and/or the like) may transmit a random access response associated with the two-step random access procedure, as described above. In some aspects, the random access response includes the uplink group grant and an indication of a type of the uplink group grant.

Process 600 may include additional aspects, such as any single aspect or any combination of aspects described below and/or in connection with one or more other processes described elsewhere herein.

In a first aspect, the random access response includes a status of the uplink group grant, the status including at least one of information that identifies a number of uplink group grants included in the random access response, or the indication of the type of the uplink group grant.

In a second aspect, alone or in combination with the first aspect, the indication of the type of the uplink group grant is transmitted in a DCI field of a random access response PDCCH.

In a third aspect, alone or in combination with one or more of the first and second aspects, the indication of the type of the uplink group grant is based at least in part on a bitmap.

In a fourth aspect, alone or in combination with one or more of the first through third aspects, wherein the DCI is associated with a CRC, wherein the CRC is masked by a group RNTI.

In a fifth aspect, alone or in combination with one or more of the first through fourth aspects, the random access response PDCCH is transmitted in a common search space.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
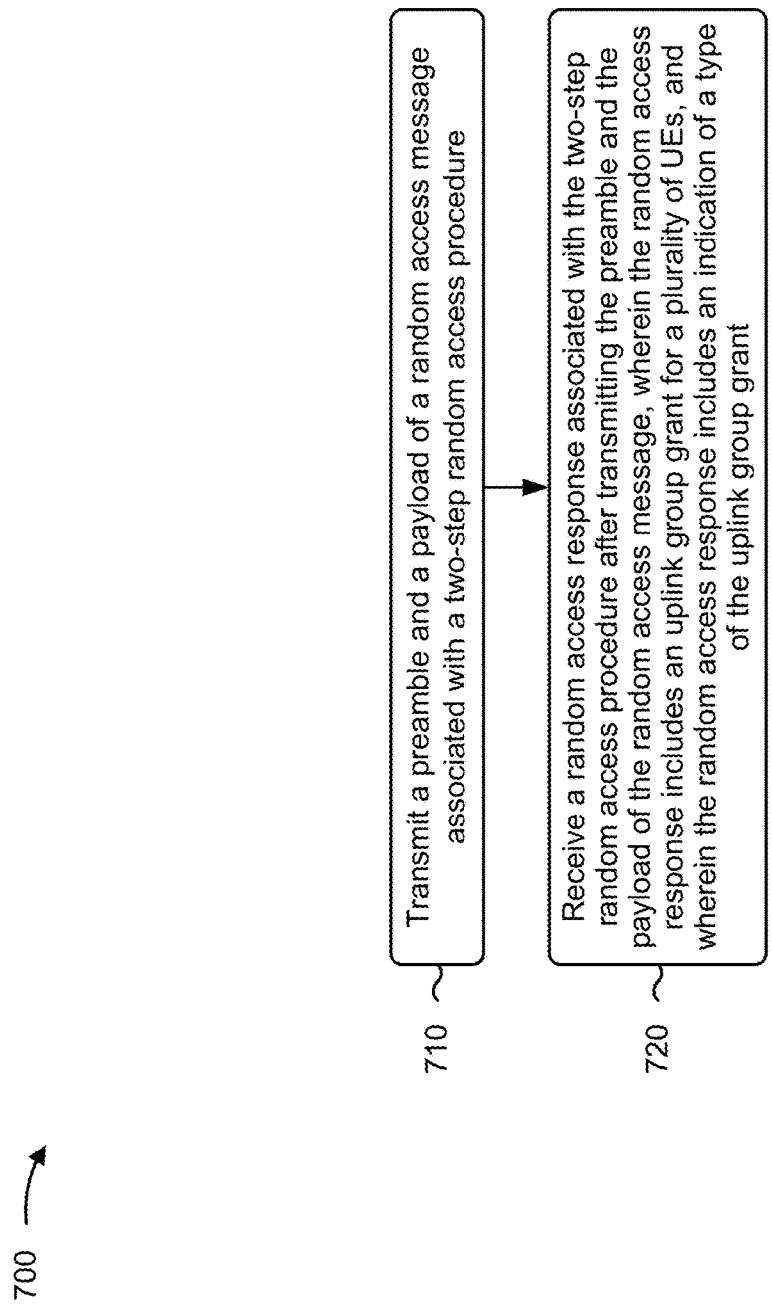
FIG. 7 is a diagram illustrating example processes performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with design considerations for a random access response for a two-step random access procedure.

As shown in FIG. 7, in some aspects, process 700 may include transmitting a preamble and a payload of a random access message associated with a two-step random access procedure (block 710). For example, the UE (e.g., using transmit processor 264, controller/processor 280, memory 282, and/or the like) may transmit a preamble and a payload of a random access message associated with a two-step random access procedure, as described above.

As further shown in FIG. 7, in some aspects, process 700 may include receiving a random access response associated with the two-step random access procedure after transmitting the preamble and the payload of the random access message, wherein the random access response includes an uplink group grant for a plurality of UEs including the UE, and wherein the random access response includes an indication of a type of the uplink group grant (block 720). For example, the UE (e.g., using receive processor 258, controller/processor 280, memory 282, and/or the like) may receive a random access response associated with the two-step random access procedure after transmitting the preamble and the payload of the random access message, as described above. In some aspects, the random access response includes an uplink group grant for a plurality of UEs including the UE, and wherein the random access response includes an indication of a type of the uplink group grant.

Process 700 may include additional aspects, such as any single aspect or any combination of aspects described below and/or in connection with one or more other processes described elsewhere herein.

In a first aspect, the random access response includes a status of the uplink group grant, the status including at least one of information that identifies a number of uplink group grants included in the random access response, or the indication of the type of the uplink group grant.

In a second aspect, alone or in combination with the first aspect, the indication of the type of the uplink group grant is received in a DCI field of a random access response PDCCH.

In a third aspect, alone or in combination with one or more of the first and second aspects, the indication of the type of the uplink group grant is based at least in part on a bitmap.

In a fourth aspect, alone or in combination with one or more of the first through third aspects, wherein the DCI is associated with a CRC, wherein the CRC is masked by a group RNTI.

In a fifth aspect, alone or in combination with one or more of the first through fourth aspects, the random access response PDCCH is received in a common search space.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication at a user equipment (UE), comprising:
   transmitting a preamble and a payload of a random access message associated with a two-step random access procedure;
   receiving a random access response, associated with the two-step random access procedure, including an uplink grant, a status of the uplink grant, and an indication of a type of the uplink grant for a plurality of UEs including the UE,
   wherein the status includes information that identifies a number of uplink grants included in the random access response, wherein the indication of the type of the uplink grant is capable of indicating that the uplink grant is for one of a fallback random access response, a success random access response, or a shared uplink grant, and wherein the uplink grant is transmitted in a set of resources shared by the fallback random access response and the success random access response; and transmitting an uplink communication on a set of shared time-frequency resources based at least in part on the uplink grant.

2. The method of claim 1, wherein the uplink grant included in the random access response indicates a network entity failing to decode the payload.

3. The method of claim 2, wherein the uplink grant is included in the fallback random access response.

4. The method of claim 2, wherein the UE is included in the plurality of UEs based at least in part on a timing offset associated with the UE or a UE status of the UE.

5. The method of claim 1, wherein the uplink grant indicates a common set of time-frequency resources, a modulation and coding scheme (MCS), common information for power control or beam management, and a physical uplink shared channel (PUSCH) hopping flag to be used by the plurality of UEs for transmitting other random access messages.

6. The method of claim 1, wherein a demodulation reference signal (DMRS) resource configuration for the plurality of UEs is explicitly indicated in the uplink grant.

7. The method of claim 1, wherein a demodulation reference signal (DMRS) resource configuration for the plurality of UEs is implicitly indicated by a mapping rule associated with preamble resource indices and DMRS resource indices configured for the plurality of UEs by a network entity.

8. The method of claim 1, wherein a timing advance (TA) command, associated with the UE, and a temporary cell radio network temporary identifier (TC-RNTI), associated with the UE, are received separately from the uplink grant.

9. The method of claim 1, wherein the uplink grant is a single uplink grant included in the random access response.

10. The method of claim 1, wherein the uplink grant is one of a plurality of uplink grants included in the random access response.

11. The method of claim 1, wherein the random access response further includes a single-UE uplink grant for another UE.

12. The method of claim 11, wherein the uplink grant is included in the success random access response.

13. The method of claim 11, wherein the indication of the type of the uplink grant is provided via a buffer status report (BSR).

14. The method of claim 11, wherein the indication of the type of the uplink grant is provided via a scheduling request (SR).

15. The method of claim 11, wherein the UE is grouped into the plurality of UEs based at least in part on at least one of:
a reference signal received power (RSRP) measurement,
a channel state information (CSI) report,
beam management,
quality of service (QOS) handling, or
a positioning-related measurement.

16. The method of claim 1, wherein an indication that the UE needs to transmit additional uplink data is included in the payload of the random access message.

17. A user equipment (UE) for wireless communication, comprising:
a memory; and
one or more processors coupled to the memory, the one or more processors, individually or in any combination, operable to cause the UE to:
transmit a preamble and a payload of a random access message associated with a two-step random access procedure;
receive a random access response, associated with the two-step random access procedure, including an uplink grant, a status of the uplink grant, and an indication of a type of the uplink grant for a plurality of UEs including the UE,
wherein the status includes information that identifies a number of uplink grants included in the random access response,
wherein the indication of the type of the uplink grant is capable of indicating that the uplink grant is for one of a fallback random access response or a success random access response, and
wherein the uplink grant is transmitted in a set of resources shared by the fallback random access response and the success random access response; and
transmit an uplink communication on a set of shared time-frequency resources based at least in part on the uplink grant.

18. The UE of claim 17, wherein the uplink grant included in the random access response indicates a network entity failing to decode the payload.

19. The UE of claim 17, wherein the uplink grant is included in the success random access response.

20. A network entity for wireless communication, comprising:
a memory; and
one or more processors coupled to the memory, the one or more processors, individually or in any combination, operable to cause the network entity to:
detect a preamble of a random access message associated with a two-step random access procedure,
wherein the random access message is received from a user equipment (UE);
process a payload of the random access message, wherein an outcome of processing the payload is either successfully decoding the payload or failing to decode the payload; and
transmit, based at least in part on detecting the preamble and the outcome of processing the payload, a random access response associated with the two-step random access procedure,
wherein the random access response includes an uplink grant, a status of the uplink grant, and an indication of a type of the uplink grant, for a plurality of UEs including the UE,
wherein the status includes information that identifies a number of uplink grants included in the random access response,
wherein the indication of the type of the uplink grant is capable of indicating that the uplink grant is for one of a fallback random access response or a success random access response,
wherein preamble transmissions of the plurality of UEs share a time and frequency occasion, and wherein the uplink grant is transmitted in a set of resources shared by the fallback random access response and the success random access response.

\* \* \* \* \*